April 1, 1969
H. H. KOPPEL
3,436,557
BUMPLESS TRANSFER SYSTEM FOR MULTIDRIVE CONTROL
Filed Sept. 17, 1965
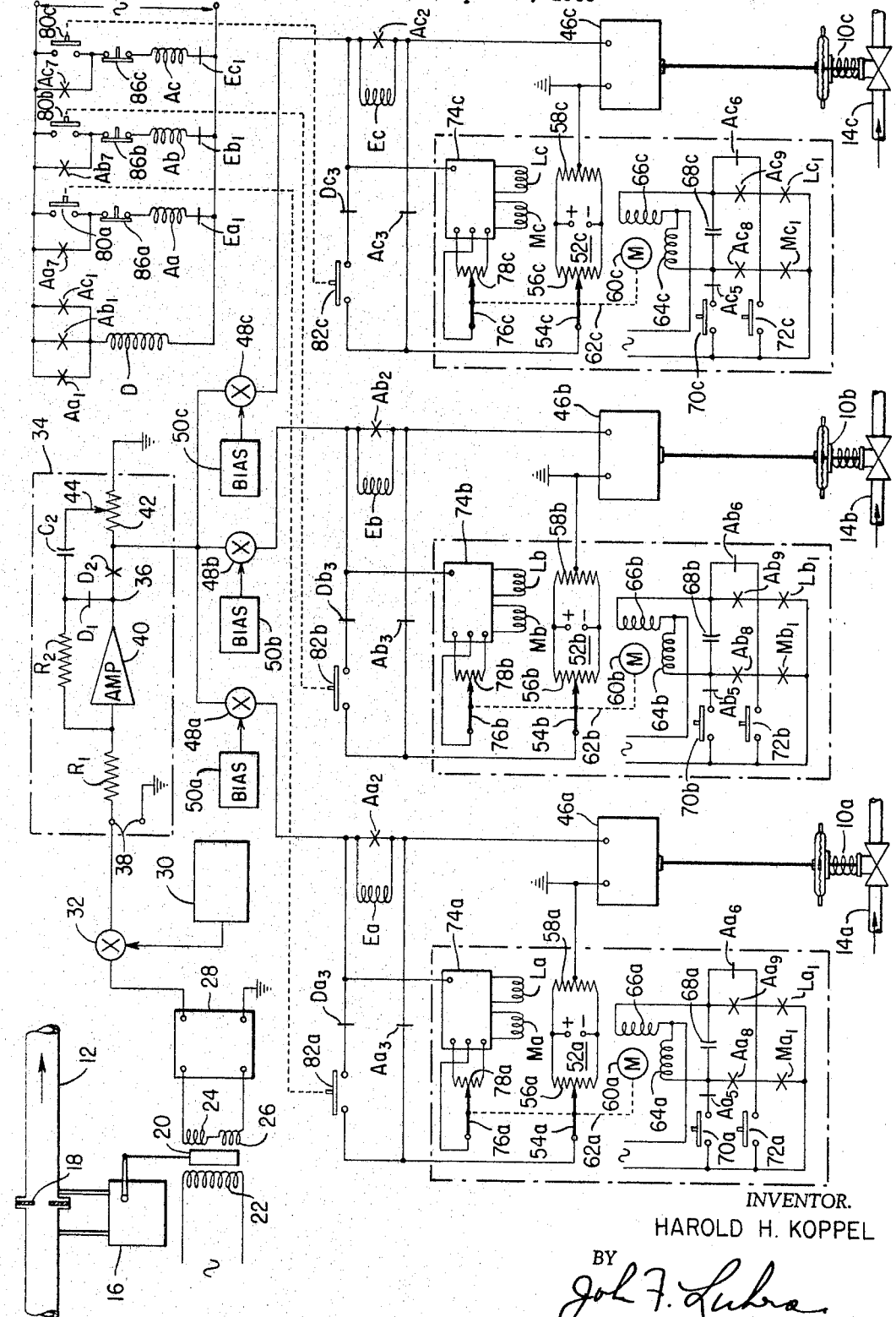
INVENTOR.
HAROLD H. KOPPEL
BY
John F. Luhrs
ATTORNEY

United States Patent Office 3,436,557
Patented Apr. 1, 1969

3,436,557
BUMPLESS TRANSFER SYSTEM FOR
MULTIDRIVE CONTROL
Harold H. Koppel, University Heights, Ohio, assignor to
Bailey Meter Company, a corporation of Delaware
Filed Sept. 17, 1965, Ser. No. 488,128
Int. Cl. H02j 1/00, 3/00
U.S. Cl. 307—87                     3 Claims

ABSTRACT OF THE DISCLOSURE

A control system providing common automatic and individual manual control for a plurality of final control elements including an equalizing circuit associated with each final control element which permits transfer of any one of the final control elements from automatic to manual operation and vice versa without introducing a bump or shock into the control system.

This invention relates to control apparatus and more particularly to apparatus for transferring control of a variable from one method of control to another.

In my U.S. Patent No. 3,068,387, Dec. 11, 1962, I disclose various methods of transferring control of a single final control element from one control signal to another and vice versa without manual adjustment of the output of either mechanism. The present invention is directed to a method of transfer of control from one signal to another in a system where a plurality of final control elements are controlled in parallel automatically from one signal but are adapted to be individually controlled from separate manually established signals.

In control systems having a plurality of final control elements of the above type it is desired at times to operate all of the final control elements automatically while at other times it is desired to operate one or more or all of the final control elements manually from their individual manual control means. In transferring from one method of control to another it is necessary that the two signals be equal to avoid a shock or bump in the control system.

Accordingly, it is a principal object of this invention to accomplish selective transfer of a plurality of final control elements from automatic to manual operation and vice versa without introducing a shock into the control system.

Another object of the invention is to continuously equalize the manual control signals with the automatic control signal for a plurality of final control elements during automatic operation thereof.

Another object of the invention is to utilize a single proportional plus reset controller to selectively equalize the automatic and manual control voltages of any one of a plurality of final control elements during manual operation thereof to permit selective transfer of the selected final control element back to automatic operation.

Other objects and advantages will become apparent from the following description taken in connection with the accompanying drawing which is a schematic illustration of a control system embodying the invention. I have illustrated and will first describe the control system in "Automatic." I will then describe the transfer operation from "Automatic" to "Manual" and lastly the transfer operation from "Manual" back to "Automatic."

Referring more particularly to the drawing, there is shown a control system having a plurality of final control elements, specifically identified as valves 10a, 10b, and 10c. These valves are actuated pneumatically in accordance with the flow rate in a conduit 12 to control the flow rate of fluid in conduits 14a, 14b and 14c respectively. A transmitting device 16 is responsive to the flow rate of fluid in conduit 12 as represented by the differential pressure across a primary measuring element 18, and is effective to actuate the movable core 20 of a movable core transformer having a primary winding 22 and a pair of serially connected oppositely wound secondary windings 24 and 26. The primary winding 22 is connected across a suitable source of alternating voltage as indicated schematically while the secondary windings 24 and 26 are coupled to a demodulator 28. With this arrangement a modulated signal is supplied to the input of the demodulator 28 with a carrier frequency corresponding to the frequency of the A-C source the modulated ampltiude of the signal being proportional to the flow rate of the fluid in conduit 12. Circuitry of this nature is well known to those skilled in the rat, and therefore, further description is deemed unnecessary.

The demodulator 28 is effective to remove the A-C carrier signal to establish a variable D-C signal at its output terminals proportional to the flow rate in conduit 12. The transmitting device 16 and demodulator 28 may be calibrated to produce any desired range and level of direct voltage at the output terminals of demodulator 28 in the range of flow rates encountered.

The output of demodulator 28 is compared with the output of a manually adjustable circuit 30 at a summing junction 32 to establish an error signal representative of the variation of the flow rate from "set point." The output of the circuit 30 is manually adjustable to provide a "set point" voltage with which the output of demodulator 28 is compared algebraically.

The error signal thus established at the summing junction 32 is impressed on the input terminals 38 of an automatic controller 34 which may be composed of one or more plug-in control action units. The controller 34 as illustrated, comprises a single plug-in control action unit having proportional plus reset action for producing an output signal at terminal 36 corresponding to the error signal applied to input terminals 38.

In general, the controller 34 comprises a high gain, low output impedance D-C amplifier 40 having a passive input resistor $R_1$ and a passive feedback resistor $R_2$ connected in series in a feedback circuit with a reset capacitor $C_2$. To adjust the gain of the controller 34, a slidewire resistance 42 is connected between the terminal 36 and ground, and is provided with an adjustable contact arm 44 to which the feedback circuit containing resistor $R_2$ and capacitor $C_2$ is serially connected. The reset action of the controller 34 is provided by the capacitor $C_2$ which causes the voltage drop across the feedback circuit to equal the time integral of the input signal applied to input terminal 38.

During automatic operation of the system the output of the controller 34 is applied in parallel to electric to pneumatic converters 46a, 46b and 46c effective to establish proportional pneumatic signals respectively for application to the valves 10a, 10b and 10c. Such converting devices are well known to those skilled in the art, and a detailed disclosure and description of this component is deemed unnecessary. As will be apparent to those skilled in the art, usually the flow rate of fluid through conduits 14 establishes either directly or indirectly the controlled condition in conduit 12. Thus in the embodiment of my invention herein disclosed it may be assumed that flow through conduit 12 is maintained at the desired value by regulating the flow through conduits 14.

The output of the controller 34 as applied to converting devices 46a, 46b and 46c may be biased at summing junctions 48a, 48b and 48c to establish different relative positions of the valves 10a, 10b and 10c respectively. The bias signals are established by bias circuits 50a, 50b and 50c respectively providing manually adjustable direct voltage signals which are summed algebraically with the controller 34 output at summing junctions 48a, 48b and 48c. During automatic operation therefore, the three valves 10a, 10b and 10c are separately biased but controlled in parallel from the output of the controller 34.

Manually operative control means are associated with each of the valves 10a, 10b and 10c to enable one or more of the valves to be operated manually independently of the controller 34. When a valve is operated manually its associated converter 46 is disconnected from the controller 34 and an electrical signal is established manually and applied thereto. As a result, the particular valve is positioned independently of variations in the flow rate in conduit 12.

A manual-automatic selector station in which the manually operative control means is incorporated is provided for each valve to effect transfer of control from the controller 34 to the manually operative control means. Since the manually operative means for the three valves are of identical circuitry, only the circuitry and operation of the manually operative means associated with the valve 10a will be described in detail.

The manually operative control means for valve 10a includes a potentiometer circuit 52a energized by a suitable source of direct voltage and having a movable contact arm 54a the potential of which depends on its position relative to a slidewire resistance 56a. The potentiometer circuit 52a is completed by a second resistor 58a having a grounded center tap connected to one input terminal of the converter 46a. With this arrangement, the voltage of contact arm 54a will be the manual control voltage.

The movable contact arm 54a is connected through contacts $Aa_3$ operated by means later to be described, to the other input terminal of the converter 46a and is positioned by an electric motor 60a acting through a linkage 62a. The motor 60a is provided with the usual energizing windings 64a and 66a which are connected in an electric circuit with a capacitor 68a across a suitable source of alternating voltage. Energization of the windings 64a and 66a is controlled, during manual operation, by a pair of normally open manually operative pushbutton switches 70a and 72a. Switch 70a is effective when closed, to connect the energizing winding 64a directly across the A-C source and to connect the energizing winding 66a in series with the capacitor 68a across the same source. As a result, a 90° phase relationship is established between the two windings causing the motor 60a to rotate in one direction. Switch 72a is effective when closed to reverse the phase relationship causing rotation of the motor 60a in the opposite direction. Thus, closure of the appropriate switch 70a or 72a will effect manually controlled positioning of the valve 10a in the desired direction.

As previously mentioned, it is necessary that the output of two alternate mechanisms be equal at the instant of transfer of control to avoid introducing a shock or bump into the control system. To establish this condition in transferring from automatic to manual operation, means are provided for effecting continuous positioning of the contact arms 54 during automatic operation in accordance with the outputs of the associated controllers so that at any instant during automatic operation, the potential of each of the contact arms 54 will equal the automatic control voltage applied to its associated converter 46.

This means, for example, comprises a servo amplifier 74a, sensitive to the signal impressed on converter 46a, effective to control energization of a pair of relay coils Ma and La having normally open contacts $Ma_1$ and $La_1$ respectively. The contacts $Ma_1$ and $La_1$ are connected in shunt circuit with the switches 70a and 72a respectively and thus energization of the relay coils Ma and La will effect rotation of the motor 60a and positioning of the contact arm 54a in opposite directions.

The motor 60a positions a contact arm 76a relative to a slidewire resistance 78a to establish a voltage feedback signal in servo amplifier 74a. The relay coils Ma and La are thus energized in accordance with the polarity of the voltage difference between the feedback signal and the signal generated by the automatic means. Rotation of the motor 60a is in a direction to maintain the two voltages equal. Thus, through automatic selective energization of the relay coils Ma and La, continuous follow-up positioning of the contact arm 54a will occur to maintain the manual control voltage exactly equal to the biased output of the controller 34 during automatic operation.

During automatic operation contacts $Aa_5$ and $Aa_6$ are open preventing operation of motor 60a by pushbuttons 70a and 72a. Conversely, during manually controlled operation contacts $Aa_8$ and $Aa_9$ are open thereby preventing operation of motor 60a through contacts $Ma_1$ and $La_1$. The operating means of these contacts will later be described in detail.

Referring now to the specific circuitry for accomplishing a bumpless transfer from automatic to manual operation, a Selector Station is provided for each of the valves 10, comprising relay coils Aa, Ab and Ac respectively, each of which is provided with contacts 1–9 indicated by the appropriate relay coil reference letter and sub numeral. Each of the relay coils A is of the time delay type well known in the art, being effective to actuate their associated contacts at a predetermined time after application of the energizing voltage to the coil. A relay coil D having contacts $D_1$–$D_3$ is connected in series with a parallel circuit comprising contacts $Aa_1$, $Ab_1$ and $Ac_1$. The contacts $D_1$ and $D_2$ are arranged to establish the normal proportional plus reset circuitry of the controller 34 during automatic operation when the coil D is energized but to convert the controller 34 to a proportional action controller during manual operation when the coil D is deenergized. For a detailed description of these circuit conditions within controller 34 reference is made to my U.S. Patent 3,068,387.

Referring now specifically to valve 10a, contacts $Aa_2$ are effective while relay coil Aa is energized to connect the output of controller 34 to the converter 46a while contacts $Aa_3$ are effective during deenergization of relay coil Aa to connect the contact arm 54a to converter 46a.

Contacts $Aa_5$ and $Aa_6$ are effective during energization of relay coil Aa to break the energizing circuits for motor 60a through switches 70a and 72a while contacts $Aa_8$ and $Aa_9$ establish energizing circuits through contacts $Ma_1$ and $La_1$. During deenergization of relay coil Aa this condition is reversed and the energizing circuits for motor 60a are established through switches 70a and 72a.

It will be apparent from the foregoing that during energization of any one of the relay coils Aa, Ab and Ac the biased output of controller 34 is applied to the associated final control element while the deenergized condition of any one of the relay coils Aa, Ab and Ac the manual control voltage is applied to the associated final control element. During manual operation of all of the final control elements, contacts $Aa_1$, $Ab_1$ and $Ac_1$ will be open deenergizing relay coil D, and the feedback circuit of controller 34 will be modified to produce proportional action for a purpose which will later be described.

Manually operative switch means are provided for controlling energization and deenergization of the relay coils Aa, Ab and Ac to thereby provide a means for transferring from automatic to manual operation and vice versa. This switch means comprises the normally open switches 80a, 80b and 80c and the normally closed switches 86a, 86b and 86c. The switches 80a, 80b and 80c are connected in series with relay coils Aa, Ab and Ac respectively and are adapted to be momentarily closed by the operator to effect energization of the same. The switches 80a, 80b and 80c are shunted by contacts $Aa_7$, $Ab_7$ and $Ac_7$ respectively which close upon energization of relay coils Aa, Ab and Ac to establish holding circuits for maintaining energization after the switches 80a, 80b and 80c are released by the operator. Manually operative normally closed switches 86a, 86b and 86c are connected in series with the relay coils Aa, Ab and Ac to provide a means for deenergizing the same when it is desired to operate one or more of the valves 10a, 10b, 10c by remote manual control. By momentarily opening the switches 86a, 86b or 86c the holding circuit established by contacts $Aa_7$, $Ab_7$ or $Ac_7$ will be broken deenergizing relay coils Aa, Ab or Ac as the case may be.

As will later be described in connection with the operation of the system, switches 82a, 82b and 82c are actuated simultaneously with switches 80a, 80b and 80c respectively to assure equalization of the manual and automatic control voltages at the instant of transfer from manual to automatic to avoid a shock in the system. Contacts $Da_3$, $Db_3$ and $Dc_3$ break the circuit during automatic operation to render a switch 82 effective only during the transfer of the first-to-be-transferred control element from manual to automatic operation.

Relay coils Ea, Eb and Ec are connected across contacts $Aa_2$, $Ab_2$ and $Ac_2$. The relay coils Ea, Eb and Ec are provided with contacts $Ea_1$, $Eb_1$ and $Ec_1$ respectively which are connected in series with relay coils Aa, Ab and Ac respectively. If the manual and automatic control voltages are not equal, the relay coils Ea, Eb and Ec will be nergized to open contacts $Ea_1$, $Eb_1$ and $Ec_1$ respectively and thereby prevent energization of rleay coils Aa, Ab and Ac.

OPERATION

In operation, assume that all of the final control elements 10a, 10b, and 10c are on automatic operation as shown and positioned in accordance with the output of controller 34. In this condition, the three relay coils Aa, Ab and Ac are energized and contacts $Aa_1$, $Ab_1$ and $Ac_1$ are closed effecting energization of relay coil D. Contact $D_1$ is open and contact $D_2$ is closed to establish the normal proportional plus reset circuitry of controller 34 wherein resistor $R_2$ and capacitor $C_2$ are connected in series in the feedback circuit as described in my Patent 3,068,387. Contacts $D_3$ are open to render the switches 82 ineffective. Contacts $Aa_5$ and contacts $Aa_6$ and the corresponding contacts in each of the other selector stations are open and contacts $Aa_8$ and $Aa_9$ closed to prevent energization and positioning of the motor 60a by switches 70a and 72a and to effect continuous follow-up positioning of the contact arm 54a as hereinbefore described. Contacts $Aa_2$, $Ab_2$ and $Ac_2$ are closed to apply the biased controller output at summing junctions 48a, 48b and 48c to the converters 46a, 46b and 46c respectively. Contacts $Aa_3$ are open.

Similar circuit conditions will exist in the selector stations for final control elements 10a, 10b and 10c, the biased signals at summing junctions 48a, 48b and 48c being applied to the final control elements 10a, 10b and 10c to effect automatic positioning thereof. Due to the follow-up action of each servo system the manual control voltage in each selector station will at any instant equal the biased automatic control voltage at the associated summing junction. Thus, at any instant any one of the control elements may be converted to manual operation without introducing a shock into the control system.

Assume now that it is desired to transfer final control element 10a to manual operation but to retain automatic operation of final control elements 10b and 10c. To accomplish this, the operator momentarily opens switch 86a to deenergize relay coil Aa and break the holding circuit established by contacts $Aa_7$. Contacts $Aa_2$ open, disconnecting the converter 46a from the summing junction 48a. Contacts $Aa_3$ close connecting the contact arm 54a to the converter 46a. Contacts $Aa_5$ and $Aa_6$ close and contacts $Aa_8$ and $Aa_9$ open to prevent energization of the motor 60a by contacts $Ma_1$ and $La_1$. The circuit conditions thus established, permit the control element 10a to be controlled manually through actuation of switches 70a and 72a while the control elements 10b and 10c are operated automatically from the output of controller 34.

If it is also desired to transfer control element 10b to manual operation the switch 86b may be actuated to effect deenergization of relay coil Ab to produce circuit conditions in the selector station for control element 10b similar to those existing in selector station for control element 10a. As a result the control element 10b may be positioned manually in a similar manner.

It is to be noted that contact $Aa_1$ and $Ab_1$ will both be open when relay coils Aa and Ab are deenergized. However, relay coil D remains energized through the circuit completed by contacts $Ac_1$.

If now control element 10c is transferred to manual operation through actuation of switch 86c, contacts $Ac_1$ will open and relay coil D will be deenergized. As a result contacts $D_1$ will close and contacts $D_2$ will open to disconnect the capacitor $C_2$ from the feedback circuit and convert the controller 34 to a pure proportional action controller. Thus, when all three control elements are operated manually the integral action of controller 34 is terminated and an output signal $e_2$ is produced at terminal 36 proportional to the input $e_1$ at terminal 38 as expressed by the following equation where K is the gain of the controller:

$$-e_2 = Ke_1 \quad (1)$$

If the gain K is equal to unity the equation will reduce to:

$$-e_2 = e_1 \quad (2)$$

If now it is desired to transfer one of the control elements such as the control element 10a back to automatic operation, momentary closure of switch 80a will energize relay coil Aa. Switch 82a closes simultaneously with switch 80a and a circuit is completed from contact arm 54a through contacts $Da_3$ to summing junction 48a. In effect the circuit thus temporarily established produces a voltage at terminal 36 equal to the sum of the manual control voltage $e_m$ and bias voltage $e_b$. At the termination of the time delay period the contacts of relay Aa are operated. Energization of relay coil D through closure of contact $Aa_1$ opens contacts $Da_3$.

Between the time of closure of switch 82a and opening of contacts $Da_3$ a voltage is supplied to the right side of the capacitor $C_2$ equal to $(e_m + e_b) X$; where X is a constant determined by the position of contact arm 44.

The output voltage $e_2$ is applied to the left side of the capacitor $C_2$ and therefore the voltage drop $e_c$ across the capacitor $C_2$ may be expressed as follows:

$$e_c = X(e_m + e_b) + (-e_2) \quad (3)$$

or $$e_c = X(e_m + e_b) + e_1 \quad (4)$$

As discussed in my aforementioned Patent 3,068,387, the output voltage of a proportional plus reset controller is equal to the voltage drop across the feedback circuit. At the end of the time delay period of relay coil Aa when contacts $Aa_1$ close energizing relay coil D, contacts $D_2$ close and contacts $D_1$ open. As a result, the controller 34 will be converted back to a proportional plus reset controller. Thus, the output voltage $e_2$ may be expressed as follows at the instant capacitor $C_2$ is reconnected in the feedback circuit.

$$e_2 = \frac{1}{X}(-e_1 + e_c) \quad (5)$$

By combining Equations 4 and 5 the following will result:

$$e_2 = e_m + e_b \quad (6)$$

Thus at the instant of transfer, the output $e_2$ of controller 34 will equal the voltage on contact arm 54a plus the bias voltage. The signal supplied to the converting device 46a at the instant of tarnsfer will thus equal the manual control voltage $e_m$.

It will be apparent that the described equalization of the manual and automatic control voltages will occur when the first control element is returned to automatic operation regardless of the identity of the control element, and that the description in connection with control element 10a is for purposes of illustration only. The time delay of relay coils Aa, Ab and Ac need only be sufficient to charge the capacitor as hereinbefore described, prior to energization of the relay coil D.

Assume that the control element 10b has been transferred back to automatic operation in the aforesaid manner and it is now desired to transfer control element 10a back to automatic operation. Switch 80a is actuated and energization of relay coil Aa will occur after a predetermined time delay to establish a holding circuit through contacts $Aa_7$. Switch 82a will also close but will have no affect on the system due to the opening of contacts $Da_3$ when control element 10b was transferred back to automatic operation. It will be necessary for contacts $Ea_1$ to close to complete the energizing circuit of relay coil Aa. Relay coil Ea is effective to hold contacts $E_1$ in an open position if the manual control voltage is not equal to the automatic control voltage. Thus, the transfer back to automatic operation of control element 10a will not become complete until the two voltages coincide as a result of variations in the magnitude of the variable or through manual actuation of switches 70a and 72a prior to actuation of switch 80a. Coincidence of two voltages may also be achieved through manual variation of the bias voltage established by 50a.

Similar transfer of control element 10c back to automatic operation will occur upon actuation of switch 80c. The transfer operation will be similar to that described in connection with control element 10a, the relay coil Ac becoming energized when coincidence of the manual and automatic control voltages occurs to effect closure of contacts $Ec_1$.

It will now be apparent that the system disclosed will effect automatic transfer of any one of a plurality of control elements from automatic to manual operation and vice versa without introducing a bump or shock into the control system. Therefore, the objects of the invention have been accomplished.

While only one embodiment of the invention has been herein shown and described, it will be apparent to those skilled in the art that many changes may be made in the construction and arrangement of parts without departing from the scope of the invention as defined in the appended claims.

What I claim as new and desire to secure by Letters Patent of the United States is:

1. In a control system, the combination comprising, a plurality of final control elements, means responsive to a variable for establishing a first electric signal, manually operative means associated with each of said final control elements for establishing a second electric signal, switch means associated with each of said final control elements operative in one position to effect positioning of its associated final control element in accordance with variations in said first electric signal and operative in a second position to effect positioning of its associated final control element in accordance with variations in the second electric signal, and means associated with each of said final control elements for continuously equalizing the said second electric signal established by the associated manually operative means with said first electric signal whereby said switch means may be selectively actuated from said first to said second position without introducing a shock into the control system.

2. In a control system, the combination comprising, a plurality of final control elements, means responsive to a variable for establishing a first electric signal, manually operative means associated with each of said final control elements for establishing a second electric signal, switch means operatively associated with each of the final control elements operative in one position to effect positioning of the associated final control element in accordance with variations in said first electric signal and operative in a second position to effect positioning of its associated final control element in accordance with variations in the second electric signal, and means operative when all of said switch means are in said second positions to equalize the second electric signal of a final control element associated with the switch means first actuated from said second to said first position with said first electric signal.

3. In a control system, the combination comprising, a plurality of final control elements, means responsive to a variable for establishing a first electrical signal, manually operative means associated with each of said final control elements for establishing a second electrical signal, switch means operatively associated with each of said final control elements operative in one position to effect positioning of its associated final control element in accordance with variations in said first electrical signal and operative in a second position to effect positioning of its associated final control element in accordance with variations in said second electrical signal, an electric controller for amplifying said first electrical signal including an electric amplifier having an external feedback circuit, a reset capacitor connected in said feedback circuit for introducing reset characteristics into said first electrical signal, and means including said reset capacitor operative when all of said switch means are in said second position to equalize the output of said controller with the second electrical signal of the manually operative means associated with the switch means first to be transferred from said second to said first position.

References Cited

UNITED STATES PATENTS 3,069,556   12/1962   Apfelbeck et al. _____ 307—87

ROBERT K. SCHAEFER, *Primary Examiner.*

H. J. HOHAUSER, *Assistant Examiner.*